(12) United States Patent
Yancey et al.

(10) Patent No.: US 8,863,629 B2
(45) Date of Patent: Oct. 21, 2014

(54) UTILITY CHAIN CUTTER

(71) Applicant: Blount, Inc., Portland, OR (US)

(72) Inventors: James Yancey, Canby, OR (US); Charlie Bailey, Canby, OR (US); Todd Gerlach, Tualatin, OR (US)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 14/026,961

(22) Filed: Sep. 13, 2013

(65) Prior Publication Data

US 2014/0013918 A1 Jan. 16, 2014

Related U.S. Application Data

(62) Division of application No. 12/470,456, filed on May 21, 2009, now Pat. No. 8,651,005.

(60) Provisional application No. 61/079,405, filed on Jul. 9, 2008.

(51) Int. Cl.
*B23D 57/02* (2006.01)
*B23D 33/02* (2006.01)

(52) U.S. Cl.
USPC .................................. 83/853; 83/35

(58) Field of Classification Search
USPC .............................. 83/835, 853, 35
See application file for complete search history.

(56) References Cited

U.S. PATENT DOCUMENTS

| | | | | |
|---|---|---|---|---|
| 624,400 A * | 5/1899 | Surgi | ............................ | 299/36.1 |
| 1,273,394 A * | 7/1918 | Mayer | .............................. | 30/381 |
| 2,749,950 A * | 6/1956 | Jamieson et al. | ................ | 83/831 |
| 2,869,534 A * | 1/1959 | Stihl | ................................ | 125/21 |
| 2,912,968 A * | 11/1959 | Stihl | ................................ | 125/21 |
| 3,346,025 A | 10/1967 | Anderson | | |
| 3,593,700 A * | 7/1971 | McNulty | ......................... | 125/21 |
| 4,546,755 A * | 10/1985 | Gustavsson | ..................... | 125/21 |
| 4,562,761 A * | 1/1986 | Alexander | ...................... | 83/830 |
| 4,796,502 A * | 1/1989 | Anderson | ...................... | 83/834 |
| 4,920,947 A * | 5/1990 | Scott et al. | ....................... | 125/21 |
| 4,971,022 A * | 11/1990 | Scott et al. | ...................... | 125/21 |
| 5,119,798 A * | 6/1992 | Scott | ................................ | 125/21 |
| 5,184,598 A * | 2/1993 | Bell | ................................ | 125/21 |
| 5,215,072 A * | 6/1993 | Scott | ................................ | 125/21 |
| 5,226,404 A * | 7/1993 | Mogi et al. | ....................... | 125/21 |
| 5,249,344 A | 10/1993 | McGuire | | |
| 5,671,725 A * | 9/1997 | Dishaw | .......................... | 125/21 |
| 5,848,564 A * | 12/1998 | Vaagen | ........................... | 83/853 |
| 6,138,658 A | 10/2000 | Bell | | |
| 6,273,082 B1 * | 8/2001 | Tselesin | .......................... | 125/15 |
| 6,478,831 B2 * | 11/2002 | Tselesin | .......................... | 51/293 |
| 6,482,244 B2 * | 11/2002 | Tselesin | .......................... | 51/293 |
| D491,205 S * | 6/2004 | Bailey | ............................ | D15/139 |
| 6,817,936 B1 * | 11/2004 | Skeem et al. | ................... | 451/547 |
| 7,836,808 B2 * | 11/2010 | Szymanski | ...................... | 83/833 |
| 7,900,536 B2 * | 3/2011 | Hensley et al. | ................ | 76/80.5 |
| 8,342,163 B2 | 1/2013 | Osborne | | |

(Continued)

FOREIGN PATENT DOCUMENTS

KR    10-1985-0003695 A    6/1985

*Primary Examiner* — Sean Michalski

(74) *Attorney, Agent, or Firm* — Schwabe Williamson & Wyatt

(57) ABSTRACT

Embodiments provide various saw chain links which may be combined to form a utility saw chain. In various other embodiments, cutting system fixtures are disclosed which may facilitate the cutting of pipes and other materials from an axis point.

7 Claims, 5 Drawing Sheets

(56) References Cited

U.S. PATENT DOCUMENTS

| | | |
|---|---|---|
| 8,555,869 B2 * | 10/2013 | Osborne et al. ............... 125/21 |
| 8,651,005 B2 * | 2/2014 | Yancey et al. ............... 83/853 |
| 2002/0046629 A1 | 4/2002 | Borschert |
| 2005/0115379 A1 | 6/2005 | Schulz |
| 2006/0243097 A1 * | 11/2006 | Raczykowski ............... 76/112 |
| 2008/0098870 A1 * | 5/2008 | Goettel et al. ............... 83/834 |
| 2011/0061639 A1 * | 3/2011 | Osborne et al. ............... 125/21 |
| 2013/0112057 A1 * | 5/2013 | Osborne et al. ............... 83/830 |

\* cited by examiner

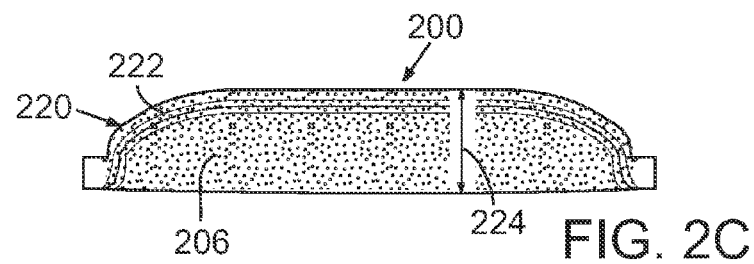
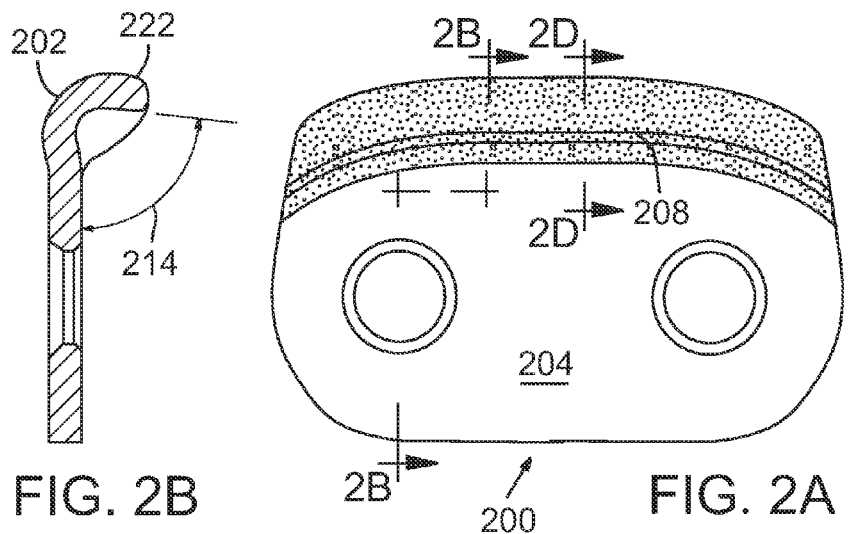
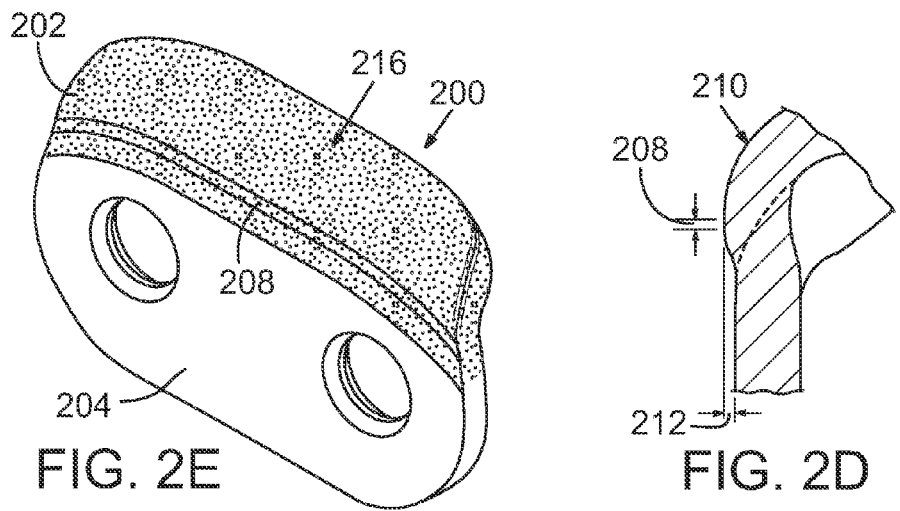

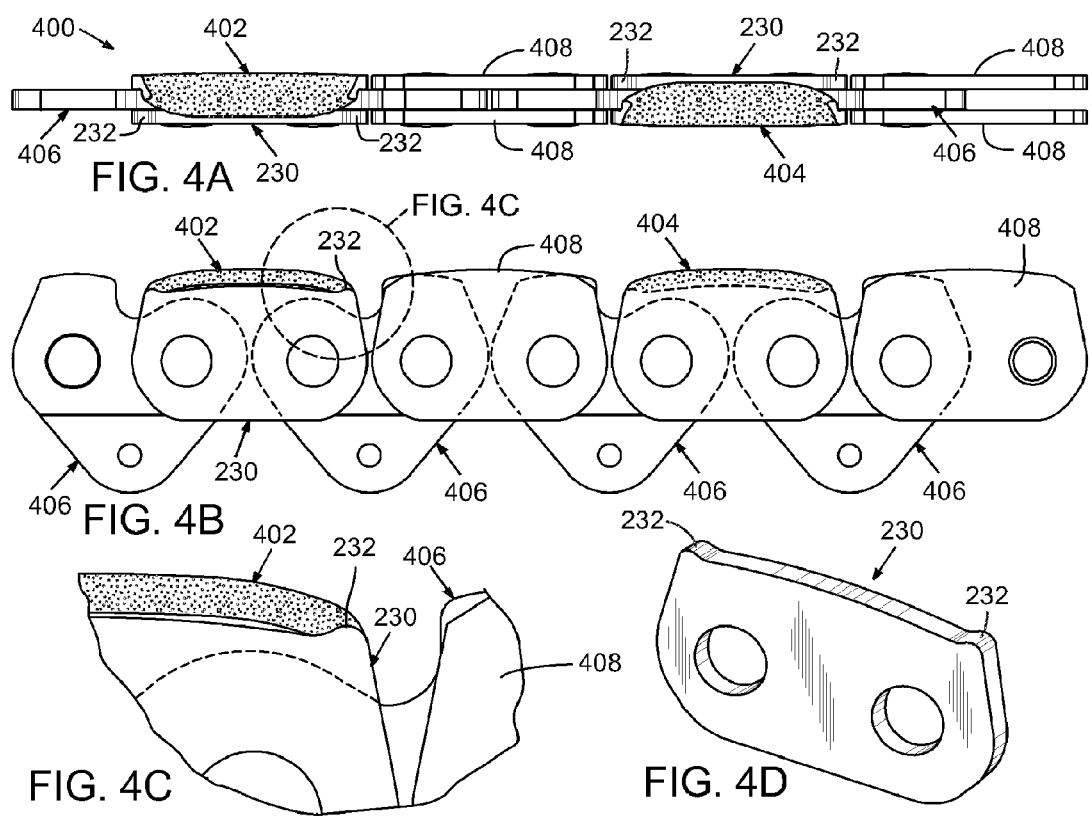

UTILITY CHAIN CUTTER

CROSS REFERENCE TO RELATED APPLICATIONS

The present application is a divisional application of and claims priority to U.S. patent application Ser. No. 12/470,456, titled "Utility Chain Cutter," which was filed on May 21, 2009, and which claims priority to U.S. Provisional Application No. 61/079,405, titled "Pipe Cutter," filed on Jul. 9, 2008. The entire disclosures are hereby incorporated by reference.

TECHNICAL FIELD

Embodiments of the present disclosure relate in general to cutting devices, and, more specifically, to utility cutting chains, components and/or chain saw fixtures.

BACKGROUND

Various materials, such as sewer pipes, water pipes, utility conduit, etc. are required to be installed and often serviced below ground. Invariably, some of these pipe sections may need to be cut to size before joining abutting ends or have various sections replaced as they degrade. This may require plunge cuts or cross cuts of pipe having diameters ranging between, for example, one inch to twelve inches or more. Such pipes may comprise a variety of materials including metal, steel, copper, ductile iron, concrete and plastic, such as polyvinyl chloride (PVC).

Generally, excavation is needed to service or replace existing underground pipe. For pipes larger than six inches in diameter, access from multiple sides of the pipe may be necessary given the limitations of existing tools. For example, typical abrasive cutting wheels are limited to cutting depths no greater than the radius of their cutting disk. Consequently, they may require the cutting wheel to completely traverse the periphery or circumference of the pipe. This may require excessive hand excavation which is time consuming, labor intensive, and expensive. Additionally, in many instances a portion of underground pipes may lie in locations where excessive excavation may result in damage to property or made difficult by various obstructions such as the presence of utility services, concrete foundations, large boulders, and/or bedrock.

Once the excavation is finished, assuming excavation on all sides of the pipe was possible, typical cutting tools such as abrasive cutting wheels may be forced into awkward cutting positions to facilitate a cut. These positions may have an impact on the ability to align the starting and stopping points of the cut as the cutting wheel traverses the pipe. Further, the use of current cutting tools, such as cutting wheels and saw chains, may be difficult in certain situations, as their cutting elements may also contribute to their ineffectiveness.

Finally, in addition to cutting pipes of various materials, it is often needed, for example during fire and rescue operations, to cut through various objects such as roofs, doors, walls, etc. Currently available abrasive cutting chains such as those used for cutting concrete are not practical for cutting materials, such as utility pipe, composition roofs, metal fire doors, etc., due in part to the large block design of the cutting elements. These chains can also experience snagging and breakage due to the acute angles they generate as they cut through the objects. Additionally, the cutting elements used in concrete cutting chain are typically designed with multiple layers of diamonds in a support matrix. It is necessary to erode the support matrix to expose additional diamonds to the cutting surface. Using concrete cutting chain to cut various materials other than concrete is not effective because the support matrix may not be eroded during the cut thereby failing to expose the abrasive to the material. Finally, typical wood chains are not suited to cut these materials due to the fact that their cutting edges are typically made of a hardened steel, which will dull, wear and/or break when used with materials other than wood.

BRIEF DESCRIPTION OF THE DRAWINGS

Embodiments of the present disclosure will be readily understood by the following detailed description in conjunction with the accompanying drawings. Embodiments of the disclosure are illustrated by way of example and not by way of limitation in the figures of the accompanying drawings.

FIGS. 2A-2E illustrate perspective views of a cutter link in accordance with embodiments of the present disclosure;

FIGS. 4A-4D illustrate various views of a utility chain and its components in accordance with various embodiments.

DETAILED DESCRIPTION OF EMBODIMENTS

Figure 1:
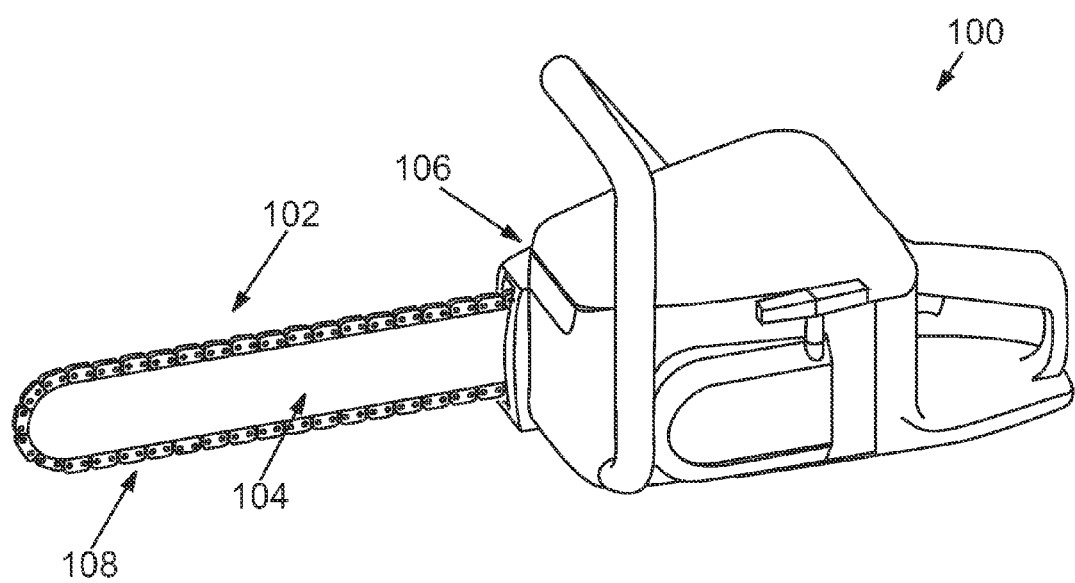
FIG. 1 illustrates a chain saw suitable for use to practice an embodiment of the present disclosure.

In the following detailed description, reference is made to the accompanying drawings which form a part hereof, and in which are shown by way of illustration of examples or embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present disclosure.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In various embodiments of the present disclosure, methods, apparatuses, and systems are provided that facilitate the use of chain saw based technology to cut various materials, including pipe, roofing materials, and other objects not suitable for cutting by typical aggregate or wood cutting chain. While the disclosure may refer predominantly to cutting pipe, those of ordinary skill in the art will readily recognize that the disclosure is not so limited. In various embodiments, a utility cutting element configured to various materials such as ductile iron and PVC utility pipes, among others, is provided. In other embodiments, the utility cutting element and/or chain may be used in a fire and rescue operation, for example, to cut through objects typically encountered like roofs, doors, walls floors and the like. Further, while the illustrated embodiments focus on utility cutting elements coupled together by center links to form a loop of cutting chain to be used on a typical chain saw and guide bar combination, in various embodiments, such utility cutting elements may be coupled to a circular disc type blade to be used with a power saw, string trimmer type power unit, and other such drivers.

Additionally, the present disclosure may provide various systems which enable the cross cutting of utility pipes from a single access point. For example, in one embodiment a system may be configured to secure a cutting system, for example a chain saw, to the pipe. In this manner, pipe may be cross-cut without the need for excessive excavation.

Referring to FIG. 1, a chain saw system 100 is generally disclosed in accordance with various embodiments. Chain saws typically cut using a chain 102 which is driven around a guide bar 104 by a spindle or drive sprocket 106 located at one end of the bar. Typically, the spindle 106 transmits power from a power supply to the cutting chain as it traverses the bar. The chain 102, in various embodiments, may include a plurality of links including, but not limited to, cutter links 108, drive links 110, bumper links 112, and/or tie straps. The composition of the saw chain may vary based on the number and pattern of the links.

In various embodiments, the length of the guide bar 104 may be varied. Typically, the length of the guide bar 104 dictates the depth of a cut the chain saw is capable of making in a single pass. For example, a chain saw equipped with a fourteen inch guide bar may have a cutting depth of up to fourteen inches. In various embodiments, it is practical to provide guide bars of twenty-four inches or longer for handheld applications, thereby yielding a cutting depth of up to twenty-four inches in a single pass. In addition to dictating the depth of a cut, the length of a guide bar may also dictate the length of chain required. While reference may be made to chain saws throughout the disclosure, the teachings of this disclosure may be applied to various other cutting devices, for example, harvesters, circular saws, and the like. The invention is not intended to be limited in this regard.

Referring to FIGS. 2A-2E a cutter link 200 of a utility chain is illustrated in accordance with various embodiments. The cutter link 200, in various embodiments, may be of formed base material such as various grades of steel, and include a transition surface 208, a first side 204, a second side, an upper surface 206, a coating, and/or an abrasive material 216, among other features. The cutter link may be configured to reduce snagging and/or breakage of a chain while performing a cross cut through material, such as pipe.

In various embodiments, the cutting element may include one or more generally curved surfaces. The generally curved surfaces may include one or more curves defined by one or more radiuses. In various embodiments, a curve may be defined by a single radius, and consequently have a consistent curvature, and in other embodiments, a curve may be defined by a plurality of radiuses and consequently have varying degrees of curvature.

With reference to FIGS. 2A-2E, a cutting link 200 including a transition surface 202 is illustrated in accordance with various embodiments. The transition surface 202 may be disposed between the first side 204 and the upper surface 206 and may include cutting radius 210, a cutting radius offset 212 and/or a flat portion 208.

In various embodiments, a cutter link 200 may have a cutting radius 210 formed about at transition surface 202, which may provide a broader or an increased contact area between a work piece (e.g. a pipe, door, etc.) and the abrasive coating 216. In various embodiments, the cutting radius 210 may reduce the pressure imposed on any individual abrasive element or particle. By reducing pressure on individual abrasive elements, operational forces that affect coating temperatures may also be reduced. This in turn may extend the life of the abrasive elements and various other chain components. Additionally the cutting radius 210 may provide clearance to a kerf that is cut in the work piece. This additional clearance may help to reduce snagging as the chain and bar rails degrade over time and experience, among other things, "lean-over".

A utility cutter link 200, in accordance with various embodiments, may have a cutting radius 210 from about five hundredths of an inch to about fifteen hundredths of an inch. Such a range has been found to help improve the cutting performance of the utility cutter link when cutting a wide variety of materials in different configurations. When a cutting radius is below five hundredths of an inch, increased wear and snagging may become more prevalent. Additionally, as a cutting radius exceeds approximately fifteen hundredths of an inch, cutting interference with one or more other chain links, such as a bumper tie strap may occur. In one embodiment, having a cutting radius of 0.01±0.02 inches is used to provide a utility cutter that reduces wear and which does not interfere with other chain components. In various embodiments, the cutting radius 210 may not be constant across the transition surface. For example, a transition surface may have no cutting radius present at a leading and/or trailing edge 240 and 242 of a cutter link, and have a cutting radius 210, as described above, between the leading and trailing edges, which may increase coating life and reduce snagging during use.

In various embodiments, a cutter link 200 may include a cutting radius offset 212, which may help prevent wear on rivet heads and additional links within the saw chain. In various embodiments, the cutting radius offset 212 may be defined as the distance the cutting radius 210 is offset from the first side 204. In various embodiments, the cutting radius offset 212 may be between approximately eight thousandths of an inch and twenty thousandths of an inch. In other embodiments, having a varied offset, e.g. less towards the leading and trailing edges and larger towards the middle of the cutter element may improve the performance of the cutter by reducing snagging tendencies and resistance to wear.

In various embodiments, the transition surface 202 may include a flat portion 208 that extends along all or part of the transition surface. A flat portion 208 may provide an improved cutting surface that may help shape the kerf to improve cutting performance and reduce the wear on the chain components. In various embodiments, the flat portion 208 may be disposed on the cutting radius 210 and form a plane that is substantially parallel to the first side 204. Where the offset is varied, the angle of the flat portion with respect to the first side may likewise vary. In various embodiments, the flat portion 208 may be between zero and four hundredths of an inch. This may add surface area to the cutting radius 210 during cut.

In accordance with various embodiments, a transition surface 202 may couple a first side 204 of the cutter link to an upper surface 206 of the cutter link 200. The transition surface 202, the first side 204, and the upper surface 206 may form a continuous body, or alternatively, be formed from multiple parts. The transition surface, then, may facilitate a forming angle 214 between the first side 204 and the upper surface 206. The forming angle 214, in various embodiments, may be less than ninety-five degrees, and in some embodiments between eighty degrees and ninety-five degrees. Forming angles above ninety-five degrees may lead to excessive wear on the upper surface 206 and lead to an increased chance of snagging during the cut. Additionally, forming angles below eighty degrees may result in increased wear on a cutting radius 210.

The upper surface 206, in various embodiments, may comprise a top edge profile 220, an overthrow edge radius 222, a leading and trailing edge radius 244 and 246, and/or an overthrow length 224. In various embodiments, the top edge profile 220 may be disposed towards the opposite side of the upper surface from the transition surface 202, and include a generally curved leading and trailing edge and a substantially straight portion between. The leading and trailing edges may include leading and trailing edge radiuses that can help improve performance and reduce snagging. In various embodiments, the leading and trailing edge radiuses may additionally facilitate smooth engagement and disengagement of the upper surface with the material being cut. This may decrease potential undesired impacting of the cutter link with the material being cut, and consequently, increase the longevity of the cutter link.

In various embodiments, the upper surface may have an overthrow length 224 that it is optimized for the cutting procedure. The overthrow length 224 may be defined as generally the distance from the inner side of the first side to the outer most edge of the top edge profile. The overthrow length 224 may be sized such that the outer most edge of the top edge profile extended just beyond the coupling chain components, which make up the width of the chain body. This is more clearly illustrated with reference to FIG. 4A. This may help ensure that the kerf width is wide enough such that wear is reduced on the chain body and also to help reduce power consumption.

The upper surface 206, in various embodiments, may also include an overthrow edge radius 222. The overthrow edge radius 222 may be applied to some or all edges of the upper surface, which may further help to increase coating life and reduce the chance of snagging during the cut. In various embodiments the overthrow edge radius may be between fifteen thousandths of an inch and forty-five thousandths of an inch.

The leading and trailing edges of the cutter body may have a vertical edge angle disposed on the front and rear portions of the cutter body. This may, not only, allow for reverse articulation of the cutter with respect to adjacent components, but may also help maintain a minimum distance from the vertical edge to the nearest rivet hole.

While each cutting link may be independently configured to reduce its wear, they may also be configured complimentarily to other cutting links in order to collectively reduce wear on the chain. In various embodiments, a cutting link may be configured as a right-handed cutter or a left-handed cutter and include a cutting edge radius, an overthrow edge radius, and/or a forming angle, among other features. While the geometry of a cutting link's features may be configured to reduce its wear as it traverses the guide bar, it may also be configured to interact with other components and provide further protection against wear.

For example, in various embodiments, a utility chain may include alternating right-handed cutter links and left handed cutter links. The left-handed and right-handed cutter links, while independent of each other, may be configured complimentarily in order to further reduce snagging, breakage, or other damage to the utility chain. In various embodiments, for example, the cutters may be configured such that a cutting edge radius of the right-handed cutter protects the overthrow edge radius of the left-handed cutter that either leads or trails the left-handed cutter. Additionally, the left-handed cutting radius may protect the overthrow edge radius of the right-handed cutter that leads or trails the left-handed cutter. In this manner, a cutting edge radius of a cutter, while providing benefits to the cutter, may also provide benefits to an overthrow edge radius of another cutter. This complementary relationship may be implemented throughout the loop of saw chain.

As another example, a right-handed cutting element may be configured with a forming angle complimentary to a forming angle of left-handed cutting element. This may result in a substantially similar contact area between the abrasive of each cutting element and the material to be cut. Having a substantially similar contact area may result in increased protection of the abrasive across each cutting element as various edges may not be exposed to the material.

Consequently, each cutter link may be configured with one or more complementary features relative to other cutting links. This may serve to balance the ability of the cutting elements to perform cutting operations and protect one or more areas including various edges, upper surfaces, and radiuses.

As illustrated in FIGS. 4C and 4D, in various embodiments, the cutter link may be complemented by a support tie strap 230, which can help resist undesired "lean over" of the cutter link that may be caused by forces encountered during a cutting operation. The support tie strap 230 may be configured for placement opposite the first side 204 of the cutter link and generally below the upper surface 206 in order to provide such support to the upper surface. In various embodiments, the support tie strap 230 may be sized such that a clearance is disposed between the lower edge of the upper surface, which helps facilitate assembly, but that is close enough to limit deflection of the upper surface to within an elastic range of the material utilized to generate the cutting element. If the upper surface includes a general radius from front to rear of the cutter element, so too may the support tie strap have such a general curvature in order to maintain the clearance. In various embodiments, the clearance may be approximately between 0.001 and 0.020 inches.

In various embodiments, the overthrow edge of the upper surface may not extend across the entire edge of the support tie strap to allow for adhesion of the abrasive elements to the surface, and yet maintain an overthrow length that is sufficient to reduce snagging.

The support tie strap 230 may be configured with one or more support tie strap protrusions 232, in accordance with various embodiments. The one or more support tie strap protrusions 232 may be bumps or raised portions disposed at the upper portion of the leading and/or trailing edges of the support tie strap. The protrusions may prevent material from penetrating the clearance and protruding under the upper surface of the cutter link. In various embodiments, the protrusions of the support tie strap 232 may be generally above the lower edge of the upper surface and below the upper edge of the upper surface so as to reduce the potential for interference with cutting operations. This is more clearly illustrated with reference to FIG. 4C.

In various other embodiments, a cutter link may additionally comprise a second transition surface coupling the upper surface to a second side opposite the first side (thus doing away with an opposing tie strap or support tie strap). In various embodiments, the first and second transition surfaces, the upper surface, and the first and second sides may form one continuous body. This may, for example, appear as a "u-shaped" cutter link. In various embodiments, the second side may replace the support tie strap. The second transition surface may have the general features described above with respect to the first transition surface.

Referring back to FIGS. 2A-2E, a coating may be disposed on a surface of at least a portion of a transition surface 202 and an upper surface 206 of a cutter link. In alternative embodiments, a coating may also be disposed on a second transition surface if present. The coating may be adapted to secure a layer of an abrasive material of a desired grit or size, for example diamonds. In various embodiments, the upper surface 206 of the cutting element and one or more transition surfaces may have curvatures adapted to provide a generally even surface for the consistent application of an abrasive coating while providing geometries capable of cutting pipe and other materials with reduced likelihood of snagging or breaking.

In various embodiments, the abrasive coating may include materials such as diamonds, cubic boron nitride (CBN), carbide, other known abrasives or super abrasives, and/or combinations of abrasives, such as diamonds and CBN. The invention is not to be limited in this regard. The abrasive coating, for example diamonds, may be layered on the surface of the cutting element as a single layer diamond coating, wherein a significant portion of the cutting edges of the abrasive elements may be exposed during a cut. In various embodiments, diamonds may have a size of thirty to forty mesh and a diamond grade of MBS970, however, other sizes and grades are contemplated. In various embodiments, diamonds may be placed in a variety of patterns and densities, for example a density of three to four diamonds per millimeter squared (3-4 $mm^2$). In various other embodiments, the abrasive coating may comprise a combination of various elements. In various other embodiments, other cutting elements may be used such as steel alloy cutting elements.

Cutting elements, in accordance with various embodiments, may be treated according to a coating process to facilitate application of the abrasive. In various embodiments, the coating process may include a heat treatment of the cutter before and/or after application of the abrasive coating, which will allow for achieving the proper hardness and toughness without further impact from the coating process. In various embodiments, the heat treatment may comprise a plurality of cooling and heating steps and may result in a substantially consistent application of an abrasive across a substantial portion of the curved surface.

Figure 3A:
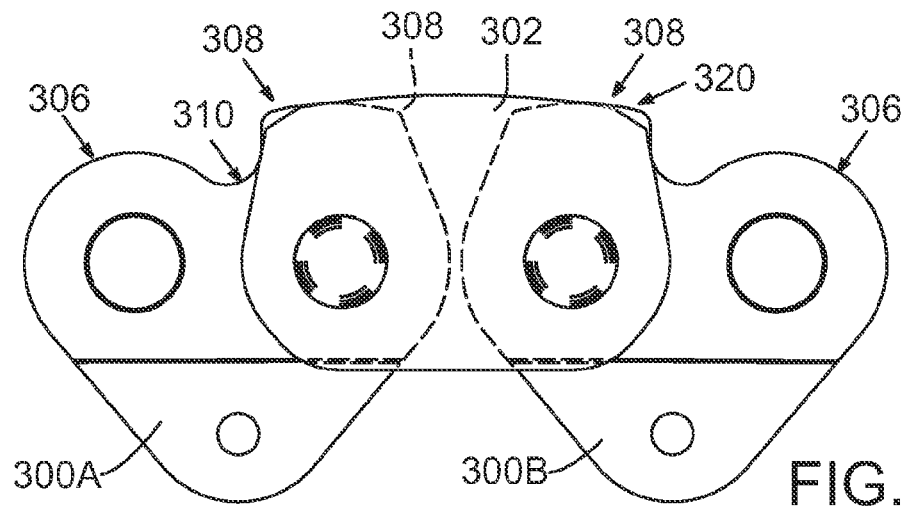
FIGS. 3A-3C illustrate various elements of a utility chain in accordance with various embodiments of the present disclosure.
Figure 3B:
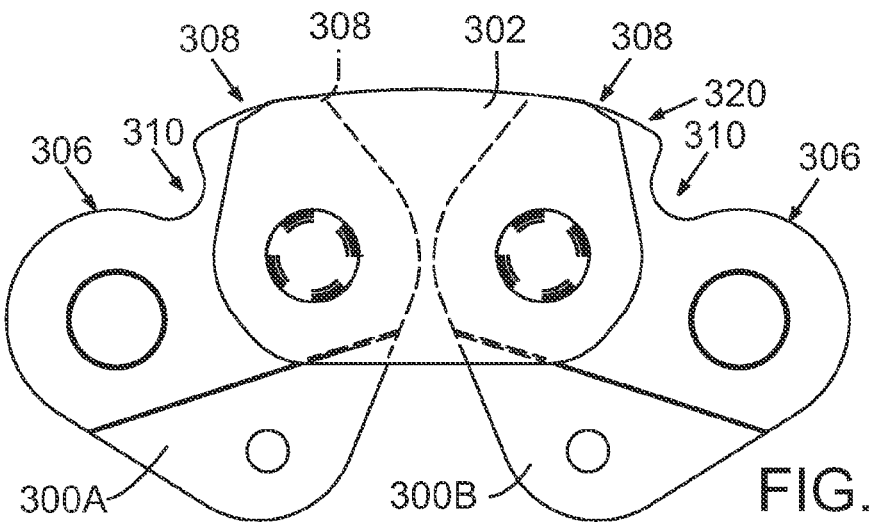
Figure 3C:
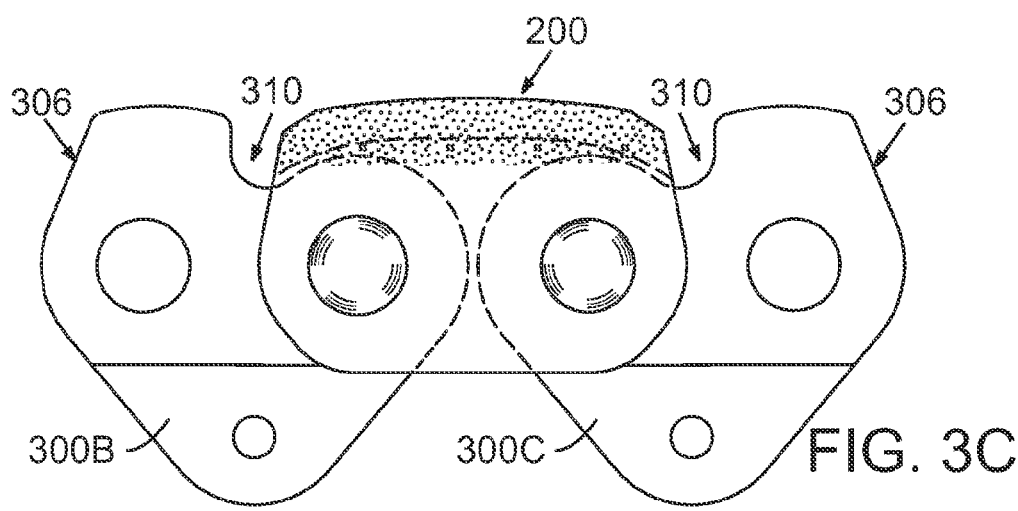

Referring to FIGS. 3A and 3B, a drive link for a utility chain is illustrated in accordance with various embodiments. In the illustration, two drive links 306 are illustrated coupled to a bumper tie strap 302, and a cutter link 200 merely for ease of understanding. In various embodiments, the drive link may include a drive tang 300A, 300B, 300C configured to engage a drive sprocket, a bumper portion 308 positioned above a rivet that includes a top surface radius configured to form an arc 320 with a top surface of the bumper tie strap during articulation, and a relief portion 310 integral with the bumper portion.

In various embodiments, a bumper tie strap 302 may serve as a depth gauge to a cutter link or cutting element. Various cutter elements may include an abrasive material, for example diamonds, deposited on their surfaces. A bumper tie strap 302 may be configured with a height that enables the abrasive material to contact the material being cut, but prevent the edge of the cutting element from impacting the material. For example if the bumper tie straps are too tall, relative to the cutter link, the ability of the abrasive to perform cuts may be limited. Alternatively, if the bumper tie strap is too short, potential damage may occur to the cutter element and/or its abrasive due to impact with the material. Additional damage may be incurred through chain snagging.

In various embodiments, the drive link 306 may be configured with a tang portion 300A, 300B, 300C that engages a drive sprocket or spindle of the power tool in order to drive the chain around the guide bar. The tang portion 300A, 300B, 300C, in various embodiments, may also engage a groove of the guide bar and the gullets of the nose sprocket to facilitate positioning of the saw chain around the periphery of the guide bar. The drive tang may be configured in a variety of manners depending upon the intended application of the saw chain.

The drive link 306 (or in other cases a center link without a drive tang portion) may be configured with a bumper portion having a height that generally matches a height of the bumper tie strap. In various embodiments, the height of the center link may help serve as a depth gauge to the upper surface of the cutter link. In various embodiments, abrasive elements may be applied to the upper surface of the cutter link. Consequently, the bumper portion of the drive link, similar to a bumper tie strap, may set the depth of the cut to a point where the diamonds engage the substance being cut, but prevent the edge of the cutter link from impacting the substance. This may prevent damage to the cutter link core and additionally reduce snagging.

In various embodiments, the drive link 306 may include a bumper portion having a radius. The radius may be directly related to a radius of a bumper tie strap. In various embodiments, the relationship may enable the bumper portion to form generally a single arc 320 during chain articulation. The single arc 320 may provide support for the various links as they traverse the nose of the guide bar.

The drive link 306 may also include a relief portion 310 integral with the bumper portion. In various embodiments, the relief portion may allow for reverse articulation of the components of a chain. Reverse articulation may occur, for example, as the chain links traverse the drive sprocket and the force of the drive sprocket effectively pushes the links into one another. In various embodiments, the relief portion 310 may enable an amount of reverse articulation to reduce impacting the upper surface of the cutter link and prolong coating life. In various embodiments, the relief portion 310 may allow at least ten degrees of reverse articulation and maintain a minimum material web around the rivets. Additionally, as illustrated, two tie straps may be coupled to a bumper drive link in order to further extend an arc. As illustrated, the two drive links may be mirror images of the other.

Referring now to FIGS. 4A-4B, a utility chain 400 is illustrated in accordance with various embodiments. As illustrated, a utility chain 400 may include multiple links including those described previously. As illustrated, a utility chain 400 includes left 402 and right 404 handed cutter links coupled to drive links and bumper spacer links in a repeating pattern. The repeating pattern is right handed cutter link, drive link, bumper spacer link, drive link, left handed cutter link, drive link, bumper spacer link, drive link, right handed cutter link, etc. This pattern of links is not meant to be construed in a limiting fashion as other patterns are contemplated.

In various embodiments, a utility chain 400 may include cutter link including a transition surface coupling a first side of the cutter link to an upper surface of the cutter link, wherein the transition surface, the first side, and the upper surface form a continuous body and including a coating disposed on the upper surface and at least a portion of the transition surface to secure an abrasive material to the transition surface and upper surface, a tie strap coupled to the cutter link, wherein the tie strap includes a top surface configured to limit an amount of material cut by the cutter link, and a drive link coupled to the tie strap wherein the drive link includes a bumper portion with a top surface, wherein the top surface has a radius configured to form an arc with the tie strap during articulation. In various embodiments, the utility chain may further include drive links which include a relief portion configured to enable reverse articulation. In various embodiments, the utility chain may include various other links known to those of ordinary skill in the art, in addition to or in combination with the links as described previously, without deviating from the teachings of this disclosure.

Figure 5A:
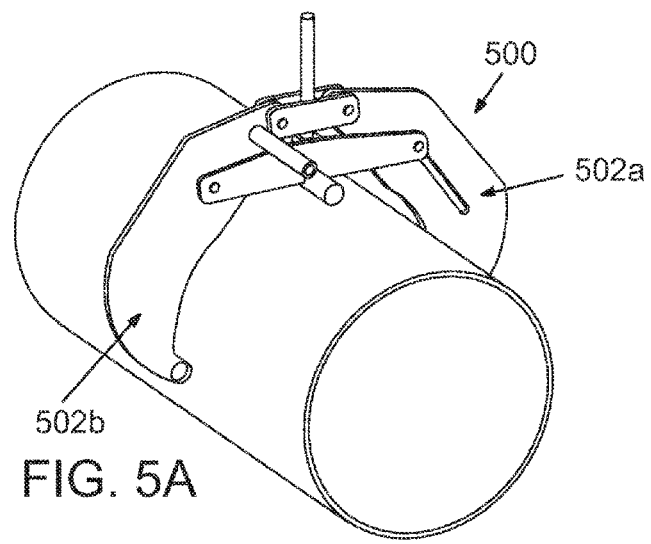
FIGS. 5A-5B illustrate perspective views of a cutting fixture in accordance with various embodiments of the disclosure.

Referring to FIG. 5, a cutting fixture 500 in accordance with various embodiments is illustrated. The cutting fixture 500 may be a pipe cutting fixture configured to facilitate attachment of a cutting element to a pipe. In various embodiments, the cutting fixture may include an attachment element including one or more stabilizing members 502a, 502b that are configured to removably couple to a material being cut and a cutting system mount coupled to the attachment element, wherein the cutting system mount is configured to facilitate attachment of a cutting element to the fixture and provide an axis of rotation for the cutting element. In various other embodiments, the cutting fixture may be configured to facilitate a miter cut, or other desired cut.

In various embodiments, the pipe attachment element may include one or more stabilizing members 502a, 502b The stabilizing members may comprise a variety of materials, including materials adapted to reduce vibrations, and be capable of adjustment to effectively secure the fixture to a variety of pipes having various diameters. In various embodiments, the stabilizing members may include a first and second stabilizing members configured to selectively engage a pipe in a clamping manner. In various embodiments, the first and second stabilizing members may contact the pipe at one or more points along the circumferential portion of the pipe. In various embodiments, the stabilizing elements may be secured in place by a set screw or other securing member such as, but not limited to, ratchet and spring loaded assemblies.

In various embodiments, the cutting system 500 mount may be configured for attachment of a chain saw having a pipe cutting saw chain as described above. In various embodiments, the cutting system mount may provide for attachment and detachment of a chain saw 408 during and subsequent to a cutting operation. In various embodiments, the cutting system mount may provide a fulcrum point 406 to apply feed load in tight conditions, such as a trench or excavation. In various embodiments, this may permit a pipe to be cross cut in one motion, wherein the path of the cutters through the pipe is rigidly supported by the fixture. In various embodiments, the cutting system mount may be raised or lowered to compensate for chain saws having different sizes or bar lengths. For example, the cutting system mount may be raised for a chain saw having a long guide bar and lowered for a chain saw having a short guide bar.

Figure 5B:
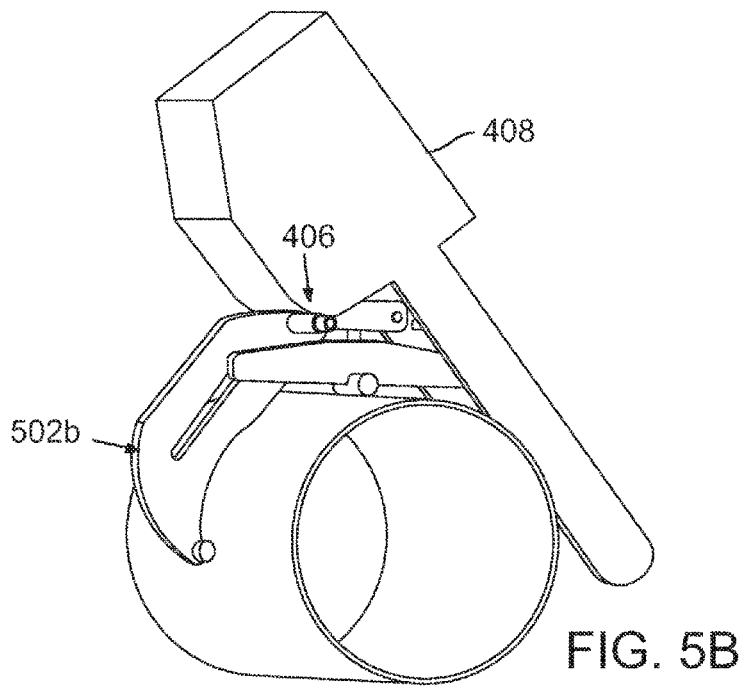

Referring to FIG. 5B, a cutting system 500 in accordance with various embodiments is illustrated. In the illustrated embodiment, a chain saw 408 is shown secured to a cutting fixture. The fixture and consequently the cutting system are secured to section of pipe. In various embodiments, the connection between the chain saw and the cutting fixture may provide a fulcrum 406 from which the cutting edges may pivot thereby cutting the pipe in a single pass from an exposed side of the pipe. In various embodiments, a user may first attach the cutting fixture to the pipe by adjusting the stabilizing members, thereby clamping the fixture to the pipe. A user may then attach a cutting system, such as a chain saw, to the cutting fixture. The user may then begin the cut on one side of the pipe and continue to the other side about the pivot point created by the coupling of the chain saw to the cutting fixture (e.g. the cutting system seat). In this manner, a single cut may be used to cross cut a pipe.

In various embodiments, a cutting fixture 500 may be coupled to a work piece (e.g. a pipe) in multiple locations, for example on both sides of a desired cut, and the mount configured to enable the cutting fixture may straddle the cutting element. This may facilitate support of the pipe on either side of the cut throughout a cutting operation and may result in a reduced likelihood of binding in the cut due to various residual stresses. Additionally, in various embodiments, after the cut is complete, the free ends of the pipe may be separated in a controlled manner, thereby increasing safety and reducing the likelihood damage to various components.

In various embodiments, the cutting fixture may be capable of secure attachment to a pipe having a variety of orientations. For example, the cutting fixture may secure to a pipe oriented in a vertical direction (e.g. a column), or alternatively in a horizontal direction. Further, the cutting fixture may be configured to couple to and cut a variety of pipe or conduit geometries.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present disclosure may be implemented in a very wide variety of ways. This application is intended to cover any adaptations or variations of the embodiments discussed herein. Therefore, it is manifestly intended that embodiments in accordance with the present disclosure be limited only by the claims and the equivalents thereof.

What is claimed is:

1. A utility chain, comprising:
    a cutter link including a body for attaching to other links and an integrally formed upper surface that is bent or curved to overhang a first lateral side of the body;
    an abrasive material coupled to the upper surface; and
    a support tie strap disposed opposite the first lateral side of the cutter link, the support tie strap having a height such that the support tie strap is disposed generally below a lower edge of the upper surface defining a clearance disposed there between to control an extent of deflection of the upper surface by engaging with the overhang of the upper surface.

2. The utility chain of claim 1, wherein the support tie strap includes one or more support tie strap protrusions configured to prevent material from penetrating the clearance between the upper surface of the cutter link and the support tie strap.

3. The utility chain of claim 2, wherein the support tie strap includes a leading edge and a trailing edge, and the one or more support tie strap protrusions are disposed at the upper portion of the leading and/or trailing edges of the support tie strap.

4. The utility chain of claim 2, wherein the one or more support tie strap protrusions have a height above the lower edge of the upper surface and below an upper edge of the upper surface.

5. The utility chain of claim 1, wherein the clearance is between 0.001 and 0.020 inches.

6. The utility chain of claim 1, wherein a forming angle between the first lateral side and the upper surface is between 80 degrees and 95 degrees.

7. The utility chain of claim 1, wherein the support tie strap has a curvature along its length corresponding to a curvature of the upper surface.

* * * * *